(12) United States Patent
VanKlompenberg et al.

(10) Patent No.: US 10,625,474 B2
(45) Date of Patent: Apr. 21, 2020

(54) LOW MASS STAKING MODULE

(71) Applicant: Extol, Inc., Zeeland, MI (US)

(72) Inventors: Andrew A. VanKlompenberg, Grandville, MI (US); Marc Meeuwsen, Zeeland, MI (US)

(73) Assignee: Extol, Inc., Zeeland, MI (US)

( * ) Notice: Subject to any disclaimer, the term of this patent is extended or adjusted under 35 U.S.C. 154(b) by 0 days.

(21) Appl. No.: 15/857,084

(22) Filed: Dec. 28, 2017

(65) Prior Publication Data

US 2019/0099962 A1 Apr. 4, 2019

Related U.S. Application Data

(60) Provisional application No. 62/439,647, filed on Dec. 28, 2016.

(51) Int. Cl.
*B29C 65/00* (2006.01)
*B29C 65/60* (2006.01)
(Continued)

(52) U.S. Cl.
CPC .......... *B29C 66/8124* (2013.01); *B29C 65/18* (2013.01); *B29C 65/305* (2013.01); *B29C 65/606* (2013.01); *B29C 66/0042* (2013.01); *B29C 66/0342* (2013.01); *B29C 66/1122* (2013.01); *B29C 66/21* (2013.01); *B29C 66/3494* (2013.01); *B29C 66/8167* (2013.01); *B29C 66/81262* (2013.01); *B29C 66/81423* (2013.01); *B29C 66/81811* (2013.01); *B29C 66/8322* (2013.01); *B29C 66/91213* (2013.01);
(Continued)

(58) Field of Classification Search
CPC ....... B29C 65/06; B29C 65/60; B29C 65/606; B29C 66/8124; B29C 66/91421; B29C 66/81871; B29C 66/81831; B29C 66/81421
See application file for complete search history.

(56) References Cited

U.S. PATENT DOCUMENTS

| 4,622,455 A | 11/1986 | Schwarzkopf |
| 5,451,288 A | 9/1995 | Smith et al. |

(Continued)

OTHER PUBLICATIONS

European Search Report in corresponding European Patent Application No. 18 215 398, dated May 24, 2019, 9 pgs.

*Primary Examiner* — Mark A Osele
*Assistant Examiner* — Christopher C Caillouet
(74) *Attorney, Agent, or Firm* — Young Basile Hanlon & MacFarlane, P.C.

(57) ABSTRACT

A low mass staking module includes a punch having a cavity on a first side, a contact surface on the second side opposite the first side, and a circular flange extending about an outer edge thereof, the punch formed of a thermally-conductive material, an annular housing engaged with the punch about the circular flange at a first end, and a heating element located inside the annular housing. The heating element has an output side in contact with the contact surface of the punch, the contact surface having a shape conforming to a shape of the output side of the heating element. The punch is desirably a low thermal mass punch, while the heating element may be a high power (watt) density, solid state, ceramic, resistant heating element (e.g., aluminum nitride or boron nitride heaters).

19 Claims, 12 Drawing Sheets

(51) Int. Cl.
 *B29C 65/18* (2006.01)
 *B29C 65/30* (2006.01)

(52) U.S. Cl.
 CPC .. *B29C 66/91214* (2013.01); *B29C 66/91231* (2013.01); *B29C 66/91421* (2013.01); *B29C 66/91443* (2013.01); *B29C 66/91951* (2013.01); *B29C 66/8122* (2013.01); *B29C 66/81261* (2013.01); *B29C 66/81831* (2013.01); *B29C 66/81871* (2013.01); *B29K 2905/08* (2013.01); *B29K 2909/04* (2013.01)

(56) References Cited

U.S. PATENT DOCUMENTS

| | | | |
|---|---|---|---|
| 6,896,024 B2 | 5/2005 | Konishi | |
| 2002/0001639 A1* | 1/2002 | Lanser | B29C 66/348 |
| | | | 425/508 |
| 2002/0017744 A1* | 2/2002 | Lochner | B21J 15/08 |
| | | | 264/479 |
| 2002/0047002 A1 | 4/2002 | Wheeler | |
| 2017/0203499 A1 | 7/2017 | Tsubone et al. | |

* cited by examiner

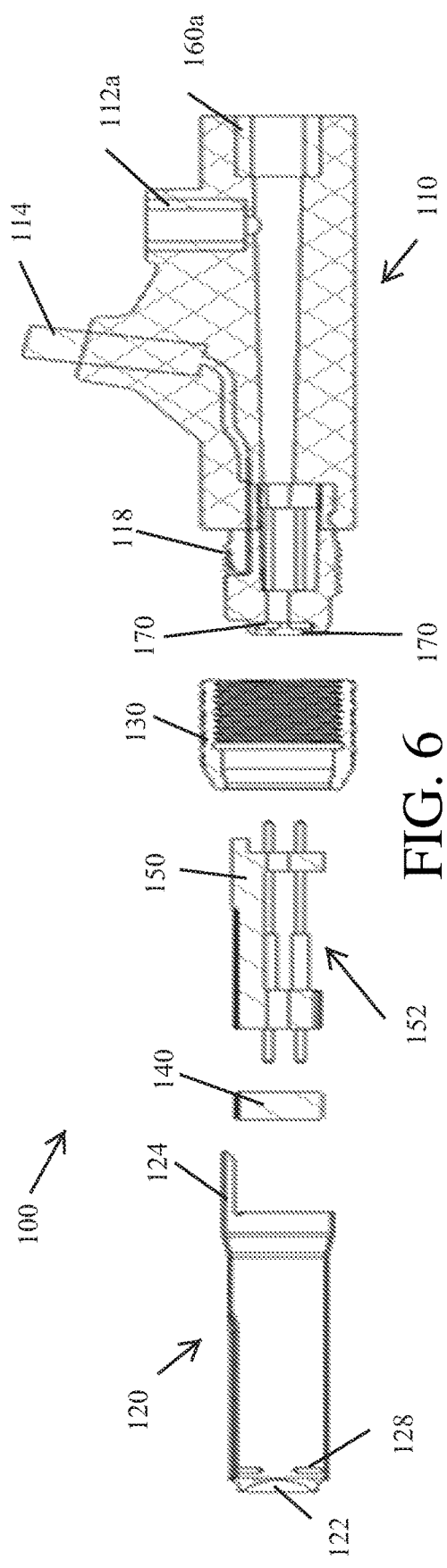
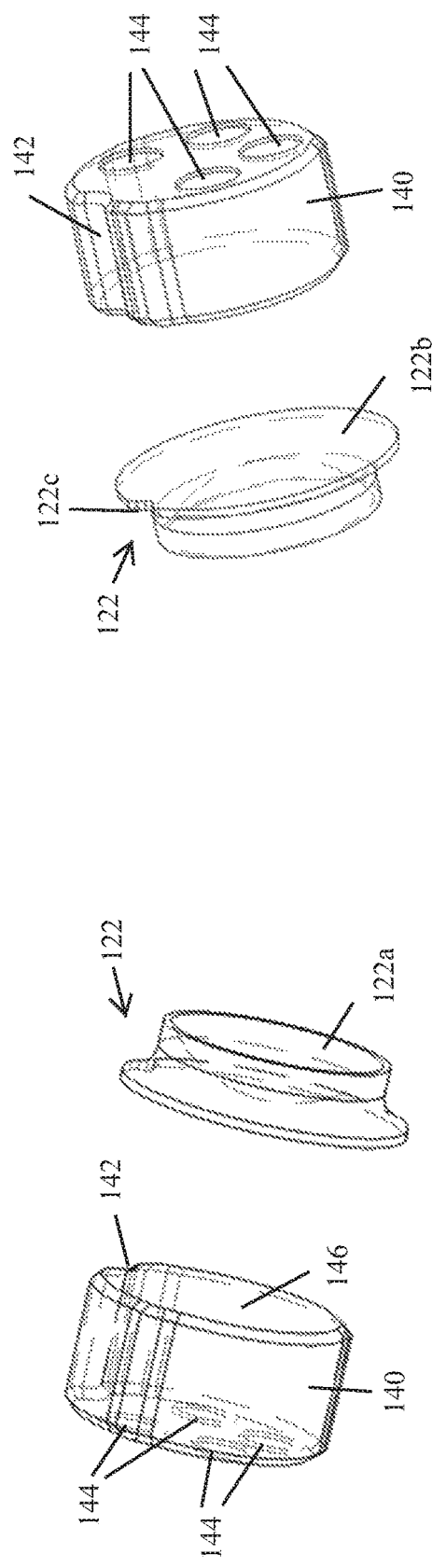
FIG. 6
FIG. 7
FIG. 8

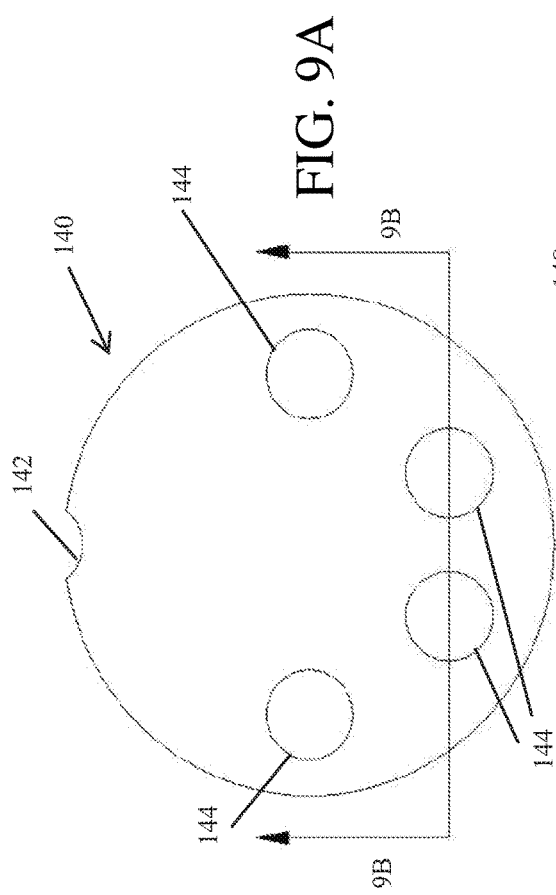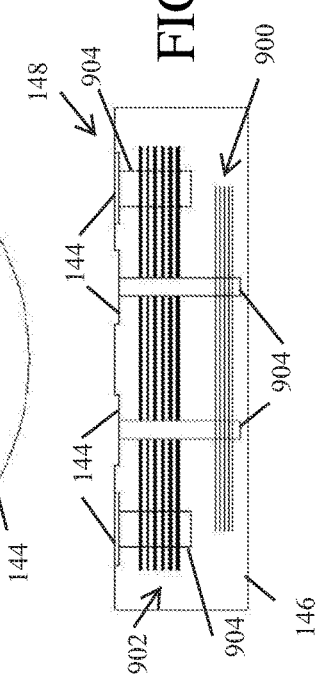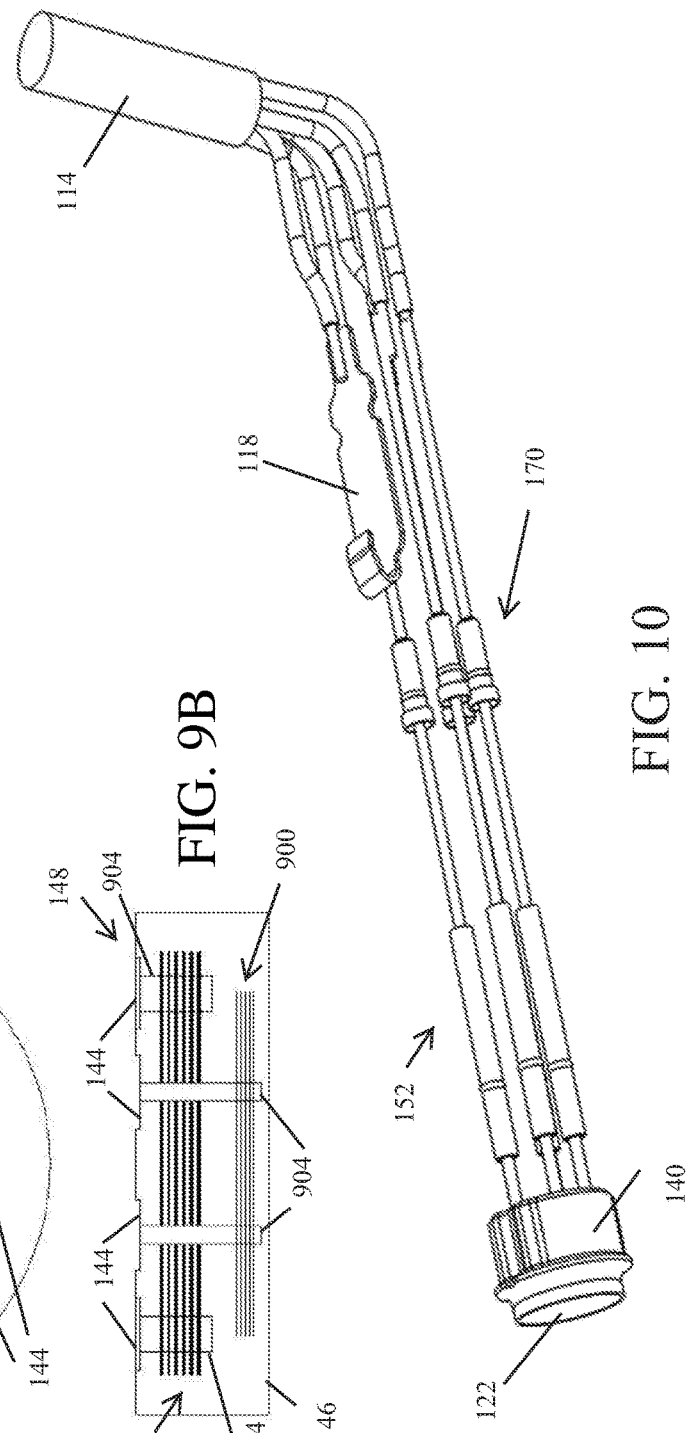
FIG. 9A
FIG. 9B
FIG. 10

LOW MASS STAKING MODULE

CROSS-REFERENCE TO RELATED APPLICATION

This application claims priority to U.S. Provisional Patent Application No. 62/439,647, filed Dec. 28, 2016, the content of which is incorporated herein in its entirety by reference.

TECHNICAL FIELD

The disclosure relates generally to plastic assembly and more specifically to plastic staking.

BACKGROUND

Plastic parts can be assembled by placing a part with clearance holes over a mating part with protrusions (bosses) that extend through and above the holes to provide a volume of plastic that can be reformed (staked) into a rivet type connection that secures the two parts. Staking is accomplished using a variety of methods.

One staking method includes an ultrasonic method that brings a punch into contact with a boss. The punch is then vibrated (e.g., vertically) at a high frequency to excite the plastic molecules and generate enough heat to soften/melt the plastic to form a rivet. A hot air, cold punch method blows heat onto a boss to heat it to a temperature that allows forming. A punch is then extended to form the heated boss into a rivet. Infrared staking directs infrared energy to a boss until the boss has absorbed a prescribed amount of energy. At that time, a punch is extended to form the boss into a rivet. Impulse staking pulses electric current through a resistive (tip) punch to heat the punch to a temperature sufficient to melt a boss. In a hot punch method, a punch is heated to heat a plastic boss to a molten state. Heat and pressure reform the plastic into the shape of the punch face to form a rivet clamping two pieces together. There are various methods used to heat the punch including conduction (e.g., a coil heater) and induction (e.g., electrical impulse).

BRIEF SUMMARY

Each of the above methods has strengths and weaknesses. The ultrasonic staking method is fast and generally involves low energy consumption, but it has the potential to transfer energy through a part, resulting in marking a display surface. Ultrasonic staking generally requires relatively high capital cost, and the process often produces high frequency noise. The hot air, cold punch method has a low capital cost. However, because it is difficult to precisely control the volume and placement of the heated air, the environment where the method is used can become uncomfortably hot when heat builds up in the part fixtures. Further, process variation and high energy consumption are common. Hot punch heat staking also has a low capital cost and is capable of producing good stakes with plastics that are not prone to sticking. A disadvantage is that the punch retains heat, making it difficult to keep plastic from sticking to the punch after staking. Like the hot punch method, infrared staking has a low capital cost coupled with a high level of stake quality. In addition, infrared staking has low energy consumption. But, infrared staking is a slower process, and reflective surfaces can become contaminated over time, causing process variation. Further, infrared staking tools are generally larger in diameter than other methods, which can limit their application for staking plastic parts. Impulse staking is fast and produces good quality stakes. While the tip is relatively small, the module size is considerably larger than the tip to accommodate the electrical components required to power the process. This can make impulse staking difficult to apply in tight spaces.

The teachings herein describe a punch constructed to minimize material (i.e., mass) sufficient to establish the shape of the desired stake while providing structural integrity sufficient to withstand the pressure required to form the stake. A punch with low mass can be heated and cooled more rapidly than a similar punch with higher mass.

The punch described herein can be heated with infrared energy (radiation), hot air (convection), ultrasonic (vibration) or by contacting the punch with a heat source (conduction). The punch can be cooled by blowing air across the back of the punch or contacting the back of the punch with a heat sink.

A low mass staking module described herein can heat and cool rapidly, which allows the punch to reach a temperature required to form a stake quickly and then cool quickly so that the punch separates from the molten plastic, retracting without plastic sticking to the punch. The physical properties of the staking module allow a relatively fast process that produces good quality stakes without surface marking. Furthermore, the staking module has both a relatively low capital cost and low energy consumption.

BRIEF DESCRIPTION OF THE DRAWING

The various features, advantages and other uses of the present disclosure will become more apparent by referring to the following detailed description and drawings. In the drawings, like reference numbers refer to like parts. Further, components are not necessarily drawn to scale unless noted.

FIG. 6 is an exploded, section view of the staking module of FIG. 1.

FIG. 7 is a view showing a relationship of a punch to a heating element.

FIG. 8 is another view showing a relationship of a punch to a heating element.

FIG. 9A is a top view of the heating element of FIGS. 7 and 8.

FIG. 9B is a section view of the heating element of FIGS. 7 and 8 along line 9B-9B of FIG. 9A.

FIG. 10 is a perspective view of the electrical circuit of the staking module of FIG. 1

DETAILED DESCRIPTION

Figure 1:
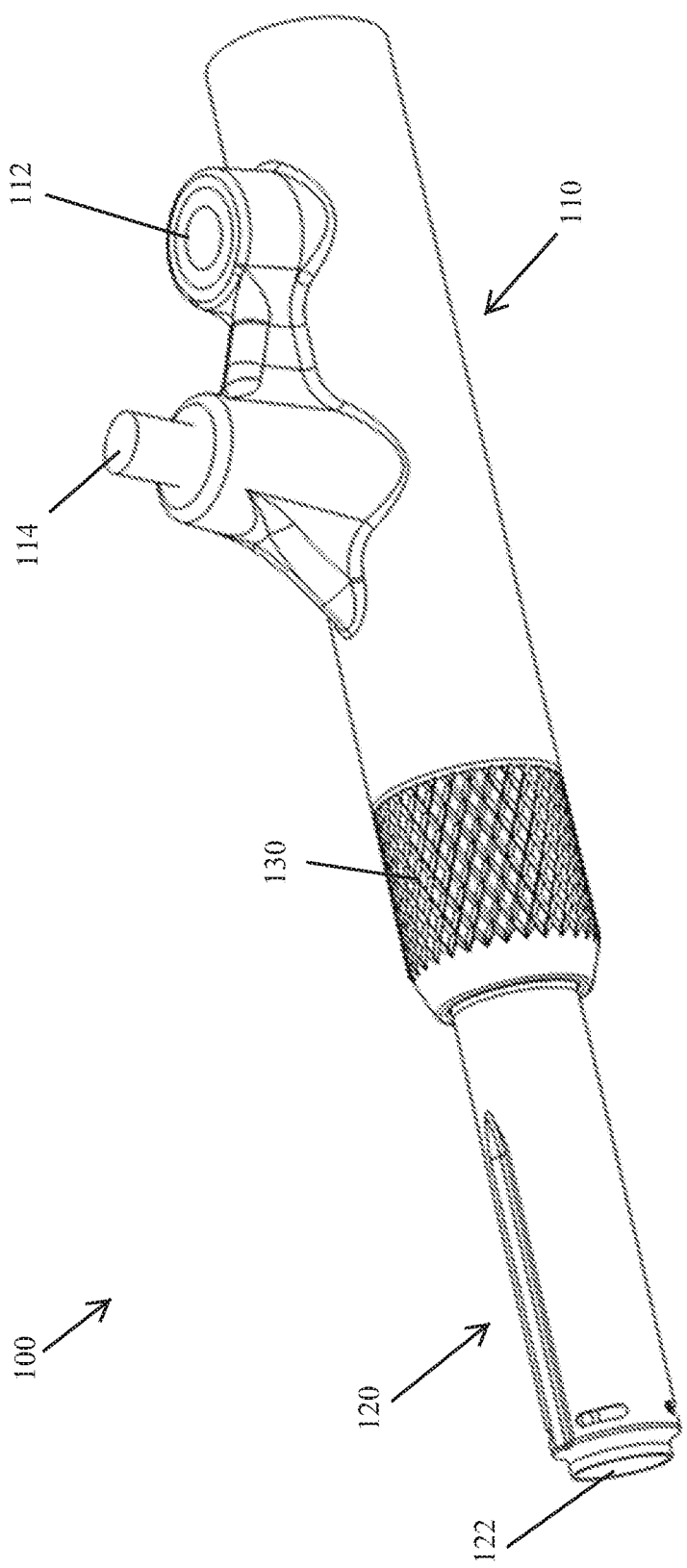
FIG. 1 is a perspective view of a first implementation of a staking module according to the teachings herein.

FIG. 1 is a perspective view of a first implementation of a staking module 100 according to the teachings herein. The staking module 100 as shown in FIG. 1 comprises two subassemblies, a module body 110 and a punch support or assembly 120, joined by a coupling nut 130. Each is an annular housing as described herein.

The module body 110 may be comprised of a plastic material, or other sturdy, non-conductive material. Extending from a first opening in the module body 110 is an air inlet port 112, and extending from a second opening in the module body 110 is an electrical cord 114. The air inlet port 112 may be coupled to a source of pressurized air. Only a portion of the electrical cord 114 is shown, and the electrical cord 114 may be any configuration or length. The module body 110 provides structural support along with an air chamber sufficient to provide a volume of air required to cool the punch 122 when the staking process is completed but before retracting the punch from the formed stake.

At an end of the punch assembly 120 opposite from the module body 110 is a punch 122. The punch 122 may be permanently attached to the punch assembly 120 such as by laser welding. The punch 122 may be made from one or more materials that have a relatively high strength to weight ratio, resist wear and have relatively high thermal conductivity. Titanium is an example of a suitable material for the punch 122, as is stainless steel. Tool steels may also be used for the material of the punch 122. The low thermal mass forming punch is constructed to minimize material (i.e., mass) sufficient to establish the shape of the desired stake while providing structural integrity sufficient to withstand the pressure required to form a stake. A punch 122 with low thermal mass can be heated and cooled more rapidly than a similar punch with more mass.

Desirably, the punch assembly 120 has the property of high strength. Light weight is a favorable, but not critical, characteristic. The punch assembly 120 may be made of or include in part the same material as the punch 122, or may include different materials from the punch 122.

Figure 2:
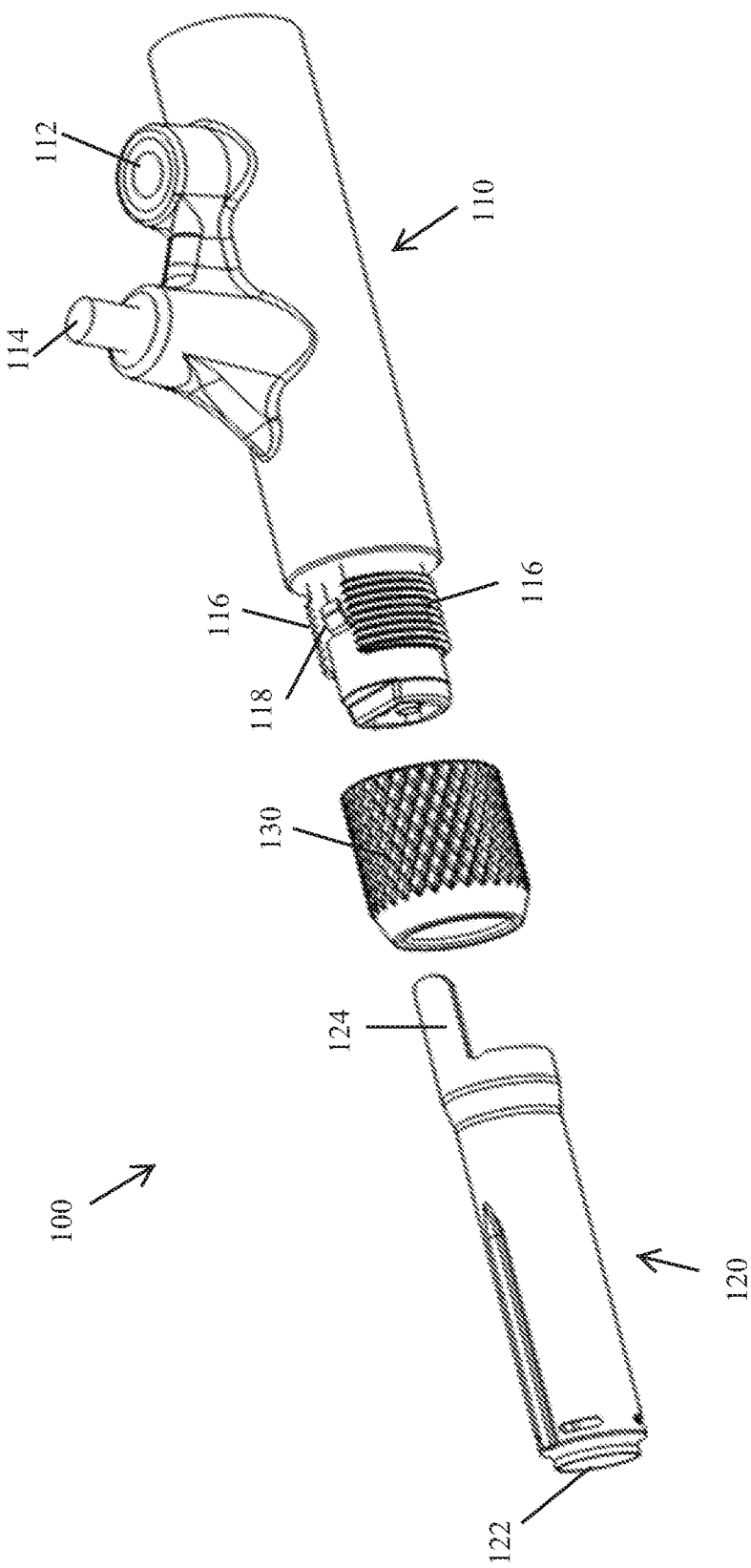
FIG. 2 is an assembly view of the staking module of FIG. 1.

FIG. 2 illustrates how the staking module 100 can be disassembled and reassembled to allow the perishable components, namely the punch 122 and a heating element (described below), to be replaced. The coupling nut 130 has a threaded interior that engages with threads 116 at an end of the module body 110. A locating tab 124 on the punch assembly 120 fits with slot in the module body 110 between the threads 116 that ends in a ground contact 118 that may form a detent. For example, the locating tab 124 may have a corresponding detent in its interior surface. Thereby, the locating tab 124 orients the punch assembly 120 relative to the module body 110, provides structural support, and provides a grounding contact against the ground contact 118. When the coupling nut 130 is tightened, the punch assembly 120 seats against the module body 110 to ensure that the punch assembly 120 is located concentric to the module body 110. When the coupling nut 130 is loosened, the punch assembly 120 can be removed from the module body 110 and be replaced with a new punch assembly 120.

Various methods can be used to deliver energy to the punch 122, including but not limited to forcing hot air into contact with and across the back side of the punch 122, energizing an infrared emitter in proximity to the punch 122, or holding a heated tool against the back side of the punch 122.

Figure 3:
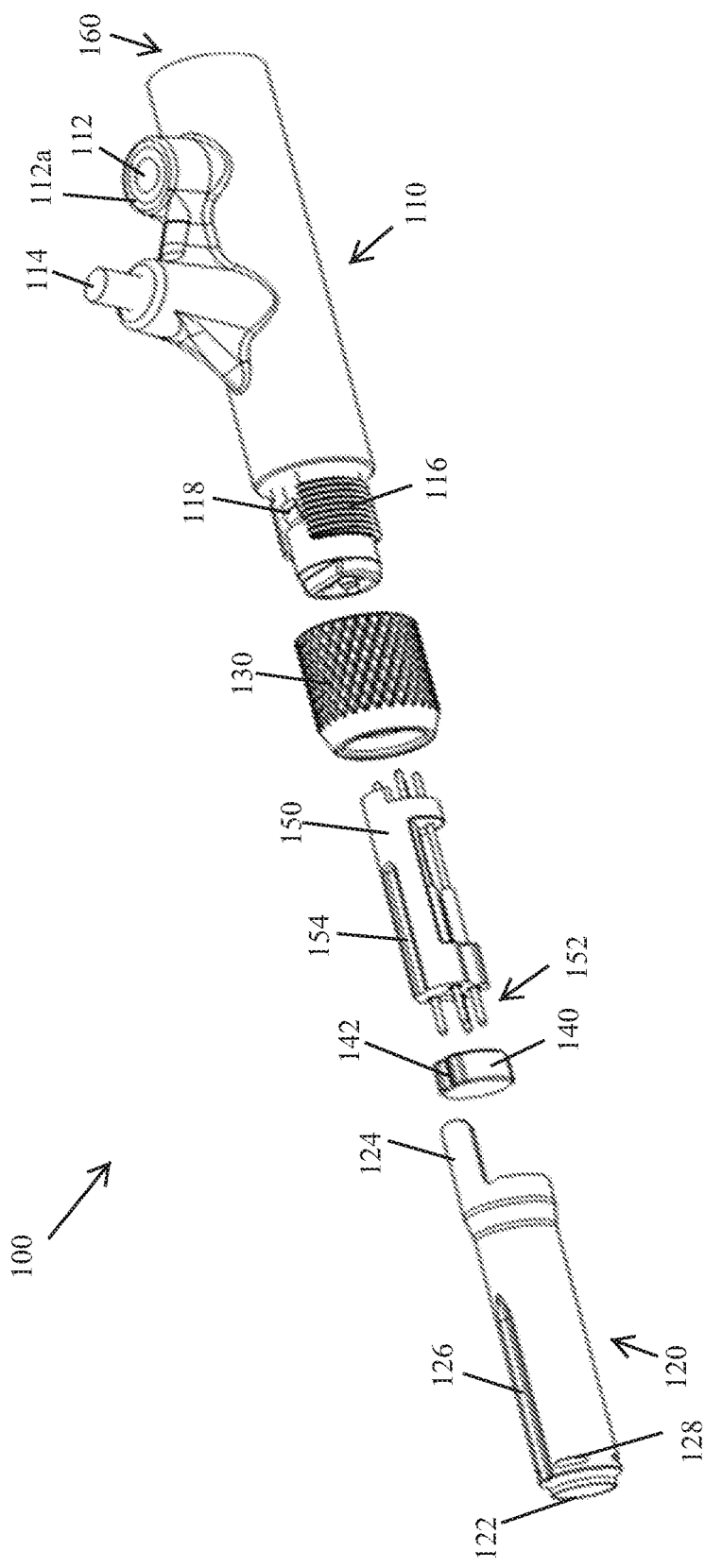
FIG. 3 is an exploded view of the staking module of FIG. 1.
Figure 4:
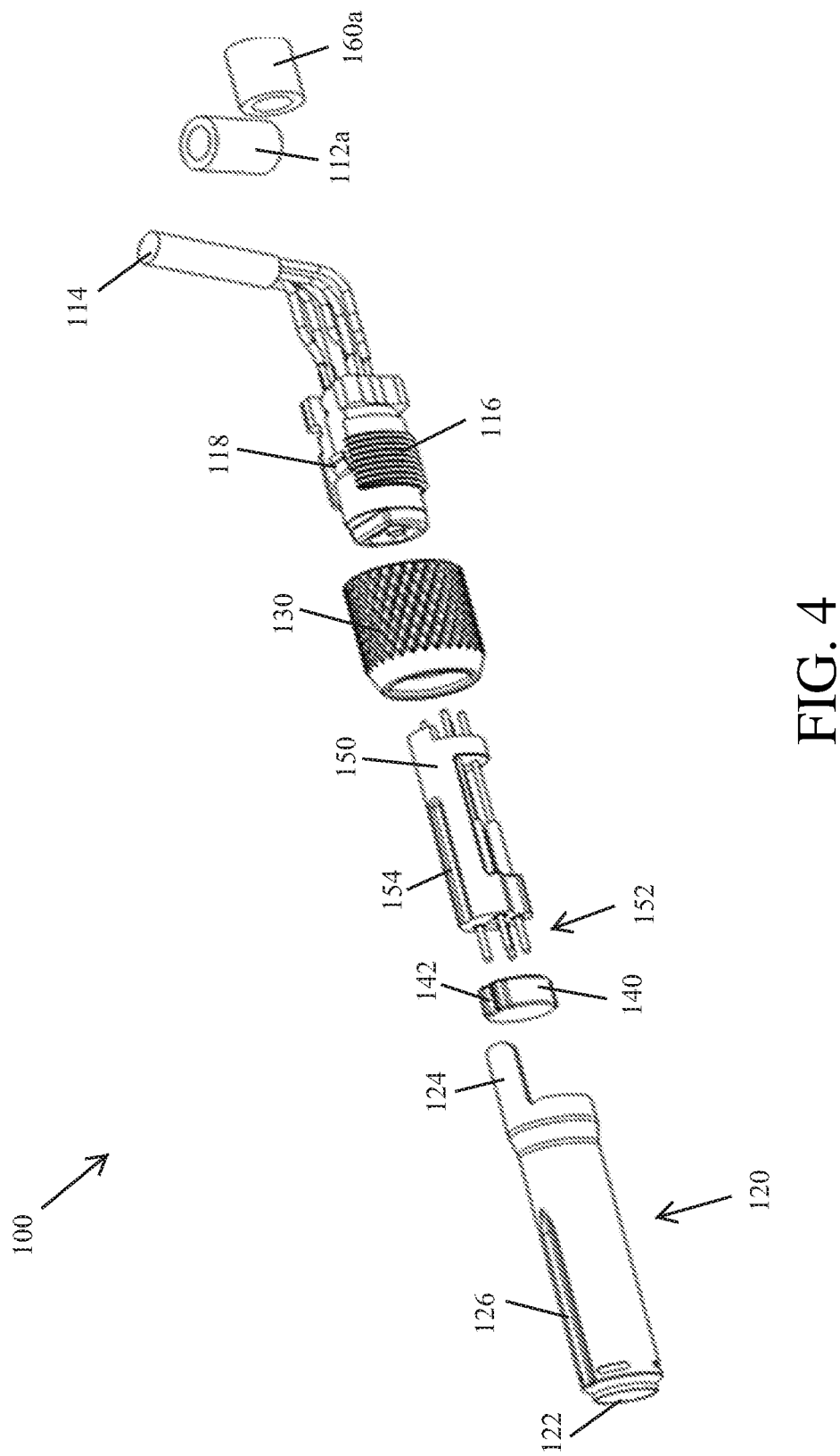
FIG. 4 is an exploded view of the staking module of FIG. 1 shown without the over-mold that encases working elements of the module body.

FIG. 3 is an exploded view of the staking module 100 of FIG. 1, and FIG. 4 is an exploded view of the staking module 100 with the over-mold of the module body 110 removed to reveal the wiring of the electrical cord 114. A heating element 140 fits into the punch assembly 120 and contacts the back side of the punch 122. In this example, the heating element 140 is a low mass, high power (watt) density, solid state, ceramic, resistant heating element that can heat the punch surface via conduction as described in more detail below with regard to FIGS. 7 and 8.

In some implementations, a defined alignment of the heating element 140 is desirable. As shown in FIG. 3, for example, a groove 142 in the heating element 140 aligns with a groove 126 formed in the punch assembly 120 to align the heating element 140 with the punch assembly 120.

A supporting (or support) structure 150 also fits into the punch assembly 120. The supporting structure 150 allows the passage of air to the punch 122 and allows signals to and from the heating element 140 by positioning and supporting connectors. Pogo pins 152 are contained and align within the supporting structure 150. The supporting structure 150 also includes a groove 154 that aligns with the groove 126 in the punch assembly 120. The alignment of the heating element 140 with the supporting structure 150 in FIG. 3 is designed so that when the pogo pins 152 are inserted into the punch assembly 120, the pogo pins 152 align with corresponding contact pads 144 on an input side of the heating element 140.

This alignment, and the relationship of the heating element 140 to the punch 122 can be seen in additional detail in FIGS. 7 and 8. The punch 122 has a cavity (also called a front side or surface) 122a and a stepped outer diameter forming a flange (also called a back side or surface) 122b. The size of the front surface 122a conforms to the volume of the boss. The front surface 122a of the punch 122 is formed or machined to the desired shape of the stake. The back surface 122b tightly fits to the bottom end of the punch assembly 120 while allowing air to escape from exhaust slots 128 described below. While the punch 122 may be welded to the punch assembly 120 as described above, other ways of securing the punch 122, such as by crimping, may be used.

The heating element 140 matches the thermal expansion properties of a heater trace with a highly thermally conductive electrical insulator body that allows high heater power densities. Heater traces may be formed through the insulating body and on the surface of the insulating body and form the contact pads 144. The insulating body is a high power (watt) density, solid state, ceramic, resistant heating element. Tungsten may be used for the one or more heater trace, while aluminum nitride and/or boron nitride may be used for the insulator body. Other combinations of materials may be used as long as the coefficient of thermal expansion of the heater traces is substantially equal to the coefficient of thermal expansion of the electrical insulator body. Materials that allow rapid heating and cooling are also desirable. The heating element 140 described has a heating rate of 250° C. per second and a cooling rate of 140° C. per second.

A resistance temperature detector (RTD) circuit is integrated with the heating element 140 (e.g., on the surface) to allow heater temperature to be monitored and controlled through the contact pads 144 as described in additional detail below.

An output side 146 of the heating element 140 may rest against a back surface 122b of the punch 122. The back surface 122b of the punch 122 may be substantially flat to provide good contact between the heating element 140 and the punch 122. While the back surface 122b is described as flat, it is not necessarily flat for its entirety. Instead, it may be flat for only a portion that corresponds to the diameter of the heating element 140. Further, the back surface 122b is made substantially flat for convenient formation through machining, etc., while minimizing material (mass). Other surface shapes can be used for the back surface 122b as long as their respective contours conform to the output side of the heating element, such as the output side 146 of the heating element 140. For example, the back surface 122b may form a convex or concave surface shape, while the input side of the heating element forms a matching concave or convex surface shape, respectively. When the heating element 140 is powered through contact of the pogo pins 152 with the contact pads 144, heat is conducted to the front surface 122a of the punch 122 to reform the boss.

FIG. 7 shows a concave surface as the front surface 122a. As can be seen more clearly in FIG. 8, the punch 122 may also include a groove 122c that can be aligned with the groove 142 in the heating element 140 within the punch assembly 120. The grooves in each of the supporting structure 150, the heating element 140, and the punch 122 can align to the groove 126 in the punch assembly 120. The punch assembly 120 aligns to the module body 110 via the tab 124. The grooves may be aligned with the central axis of the punch assembly 120. This alignment fixes the orientation of the elements relative to each other.

FIGS. 9A and 9B show further details of one implementation of a heating element 140 that may be used in implementations of the staking module described herein. FIG. 9A is a top view of the heating element of FIGS. 7 and 8, and FIG. 9B is a section view of the heating element of FIGS. 7 and 8 along line 9B-9B of FIG. 9A.

The heating element 140 may be produced by layering the material of the insulating body, and forming a trace layer on at least some of the layers before adding a new layer. In FIG. 9B, the traces 900 of the layers closest to the output side 146 of the heating element 140 form the RTD circuit. The traces 902 form a heaters within the layers of the insulating body. Traces placed on the different layers may form contacts 904 that extend to the input side of the heating element 140 at the form the contact pads. The contacts 904 provide contacts between the layers for the traces 900 and traces 902. For example, two of the contact pads 144 may be electrically coupled to some of all of the traces 900 to control the temperature of the heating element 140 (and hence the punch 122) as described below with regard to FIGS. 14 and 15 as described below, while the other two of the contact pads 144 may be electrically coupled of some or all of the traces 902 to sense and feedback the temperature, which closely relates to the temperature of the punch 122 and can be used for control of a staking module, such as the staking module 100.

Referring again to FIGS. 3 and 4, an end of the module body 110 opposite to the end with the threads 116 is a mounting end 160. The air inlet port 112 includes an air inlet insert 112a, and the mounting end 160 includes a mounting insert 160a. Although not shown in detail, the air inlet insert 112a and the mounting insert 160a may be threaded on the inside diameter to accommodate corresponding threads in a mating component for a threading engagement. A sliding fit with a mating component is also possible. The mating component for the air inlet insert 112a can be an air hose. Together, the mounting end 160 and the mounting insert 160a may be referred to as a mounting bracket. The mating component for the mounting bracket may be a support structure or actuator that provides force and motion parallel to the radial axis of the punch 122 and hence the boss as is known in the art. The inserts 112a, 160a may be knurled on the outside diameter to prevent rotation in the over-mold when torqued. Each may also include an inner layer of elastic or rubber material that can seal the air chamber formed by the module body 110 to prevent the air in the chamber from leaking out of the module body 110 during operation.

As can be seen from comparing FIGS. 3 and 4, the wires of the electrical cord 114, the grounding contact 118, the air inlet insert 112a, and the mounting insert 160a are secured in position when the module body 110 is over-molded. In this way, the over-mold encases working elements of the module body 110.

Figure 5:
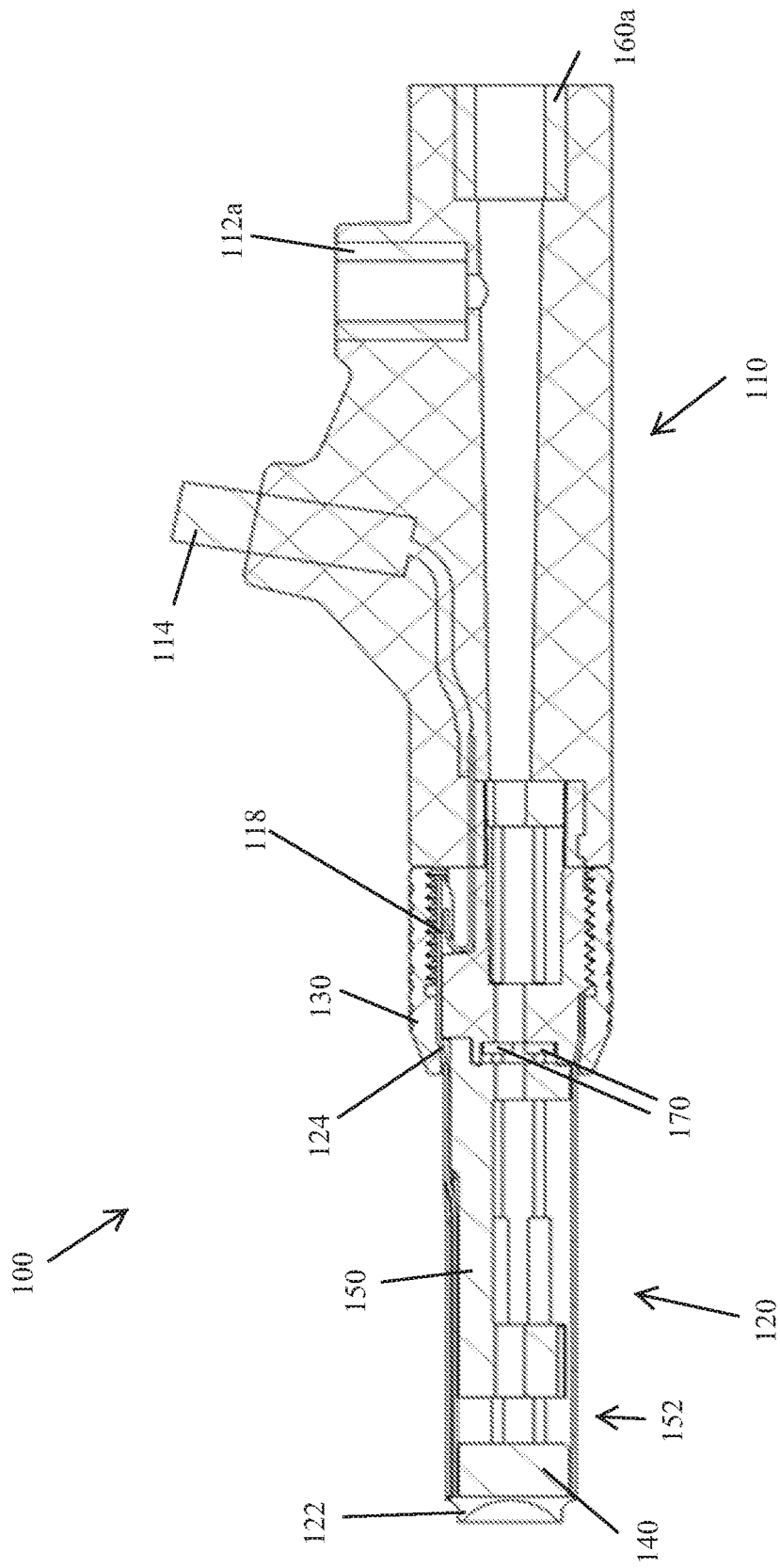
FIG. 5 is a section view of the staking module of FIG. 1.

FIG. 5 is a section view of the staking module 100 of FIG. 1, and FIG. 6 is an exploded, section view of the staking module 100 of FIG. 1. The punch 122 has a concave surface. The heating element 140 slides into the punch assembly 120 and is pressed against the punch 122 by the pogo pins 152. The supporting structure 150 aligns the pogo pins 152 so that they press against the contact pads 144 of the heating element 140. Integral springs in the pogo pins 152 provide a force against the heating element 140. The other ends of the pogo pins 152 engage socket connectors 170 of the wires of the electrical cord 114. The coupling nut 130 secures the punch assembly 120 to the module body 110. In FIG. 5, the locating tab 124 of the punch assembly 120 can be seen in position and in contact with the ground contact 118. FIGS. 5 and 6 also show the positions of the electrical cord 4, the air inlet insert 112a, and the mounting insert 160a in the module body 110.

The electrical connections made by the pogo pins 152 are more shown in FIG. 10, which is a perspective view of the electrical connections through the staking module 100. The electrical connections power, monitor, and regulate the heating element 140. The circuit shown provides power as well as feedback from the RTD integrated into the heating element 140.

Power is supplied through the electrical cord 114. The staking module 100 may use 120 volts AC and 2 amps per module but other voltage/current combinations can be used. Further, heating elements 140 can be provided in a range of power outputs and resistance. In this example, the electrical cord 114 includes five wires, one ground wire, two RTD wires, and two power supply wires. The ground wire is soldered to the ground contact 118. The other four wires are soldered to respective socket connectors 170. The socket connectors 170 include socket type receptacles that receive the end of the pogo pins 152 when the punch assembly 120 is affixed to the module body 110.

Figure 11:
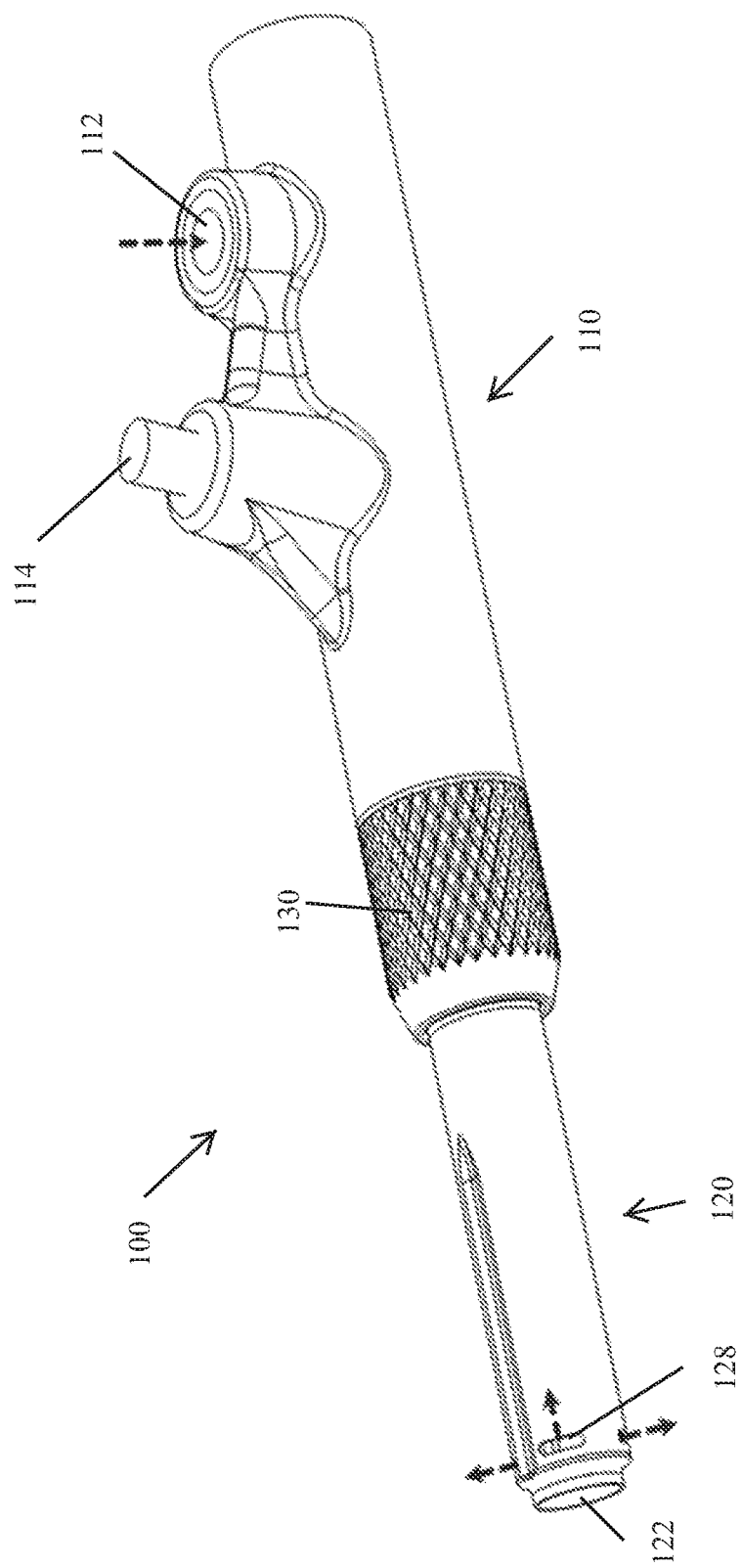
FIG. 11 is a perspective view illustrating how cooling air is delivered from a source to the heating element and the punch.
Figure 12:
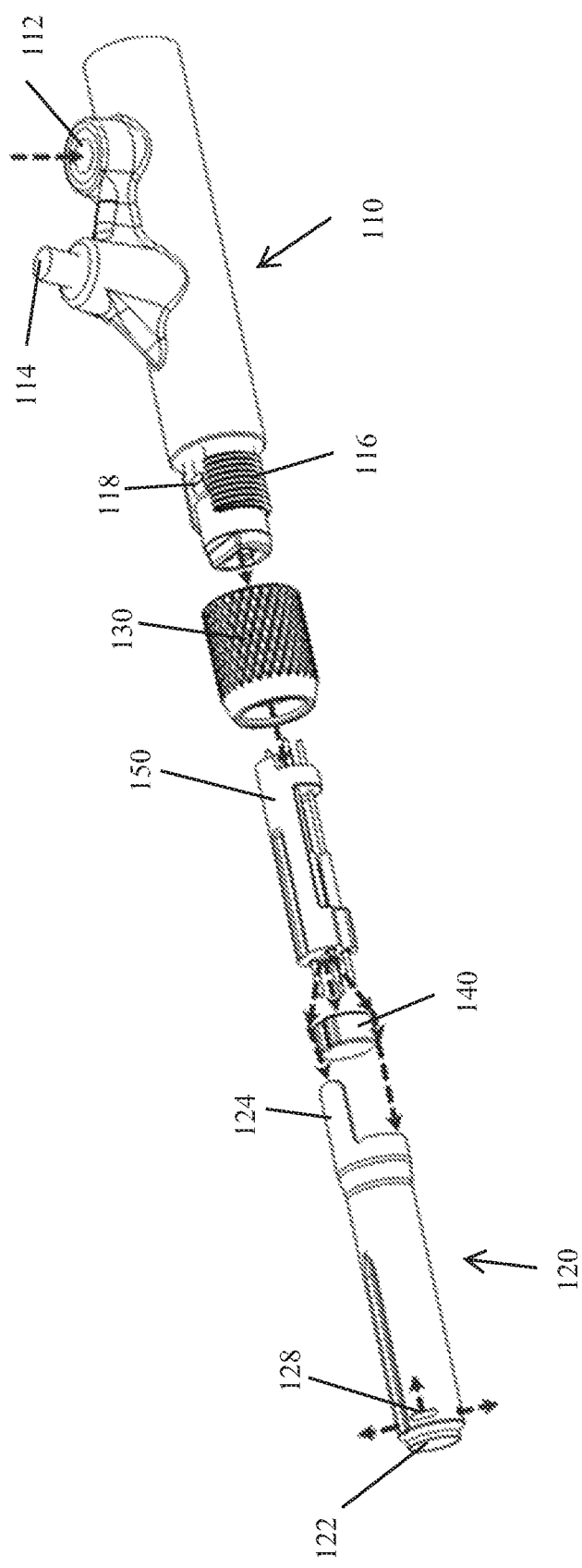
FIG. 12 is an exploded view showing how cooling air flows through the staking module.

FIGS. 10, 11, and 12 show how cooling air flows through the staking module 100. Dashed arrows identify the direction of the air flow. In the perspective view of FIG. 11, air, in particular pressurized air, flows from a source into the staking module 100 through the air inlet port 112 and exhausts through multiple exhaust slots 128 arranged about the perimeter of the punch assembly 120. In the example herein, there are three exhaust slots 128, but more or fewer exhaust slots 128 are possible. The exhaust slots 128 may be equidistantly spaced. The pressurized air cools the heating element 140 and the punch 122. More specifically, exhausting the air through the exhaust slots 128 causes the air to flow around the heating element 140. As the heating element 140 cools, the punch 122 conducts heat into the heating element 140, causing the punch 122 to cool. As the air exhausts through the exhaust slots 128, some air flows around the exterior of the punch 122, which provides additional cooling affect. Air pressures of 60 to 100 standard cubic feet per hour may be used to cool the heating element 140 and the punch 122.

Figure 13:
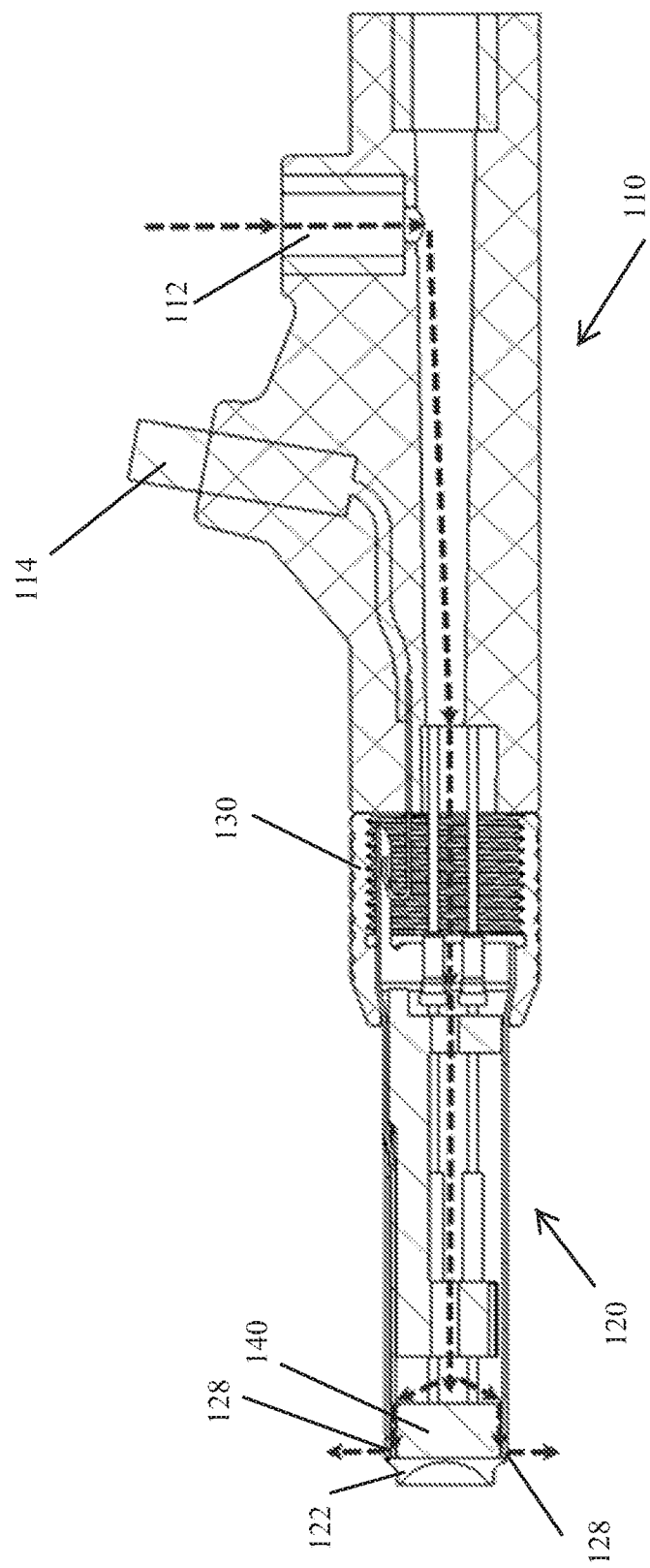
FIG. 13 is a section view showing cooling air passages through the inside of the staking module.

The exploded view of FIG. 12 and the section view of FIG. 13 show how cooling air flows through the inside of the staking module 100. Pressurized cooling air flows from the air inlet port 112 through the center of the staking body 110 to the heating element 140. The diameter of the heating element 140 is smaller than the inside diameter of the punch assembly 120 to provide space for the air to flow around the heating element 140 and out the exhaust slots 128. A pneumatic fitting can be attached to the air inlet port 112 to provide a connection for the pressurized air source.

Figure 14:
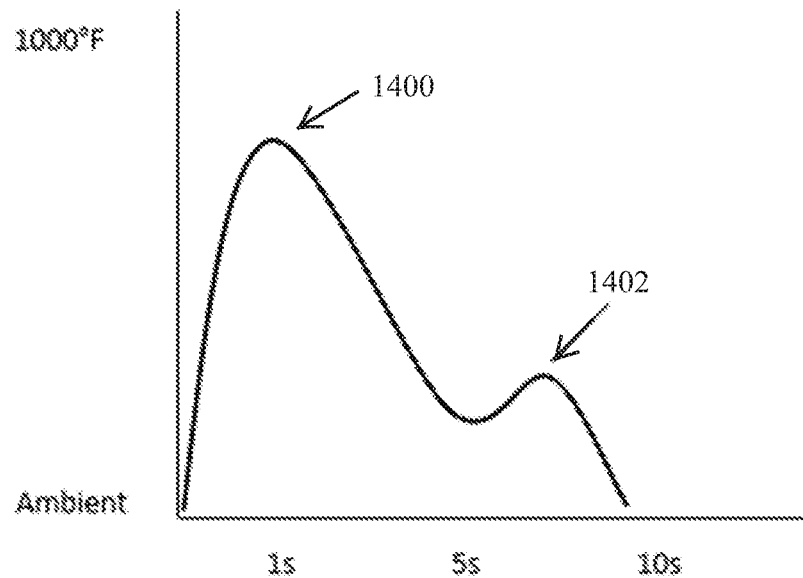
FIG. 14 is a graphical view of a flash cycle.

FIG. 14 illustrates a technique that may be used with a staking module described herein, such as the staking module 100, to prevent some plastics from sticking to the punch, such as the punch 122. The graph of FIG. 14 plots temperature over time. The initial heat cycle melts the plastic and forms the stake, and may be referred to as a staking cycle 1400. That is, the implementations of a staking module described herein may be used in a process described with regard to FIG. 17, where a staking module 1700 according to the teachings herein is shown schematically.

Figure 17:
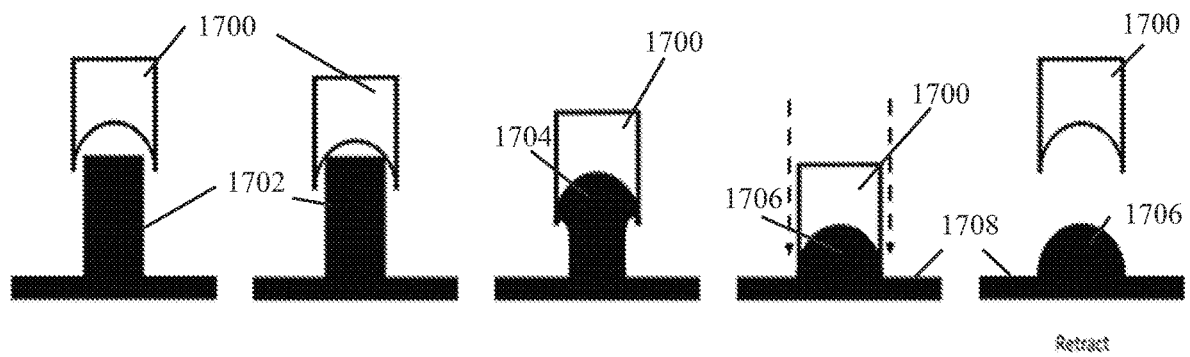
FIG. 17 is a schematic view of a hot punch staking sequence.

As shown in FIG. 17, the staking cycle 1400 starts with a punch of the staking module 1700 being energized, resulting in the punch face heating to a set temperature. The staking module 1700 is moved so that it contacts a boss 1702. The staking module 1700 can be heated before or after contacting the boss 1702, although it is shown before it this example. The hot punch pushing against the plastic boss heats the plastic to a molten state and reforms the plastic to the shape 1704 of the punch face, such as in the generally semi-circular shape of the front surface 122a of the punch 122. Downward pressure and heat form the boss 1702 into a stake or rivet 1706 in a piece 1708 that clamps the piece 1708 to another piece. Once the stake 1706 is formed, the punch is cooled, e.g., by blowing cooling air across the punch. For example, cooling air from the source at the air inlet port 112 flowing into the module body 110 is then directed at the punch 122 and is released through the exhaust slots 128. As the temperature of the punch lowers, the surface of the formed plastic stake 1706 cools (via conduction). As the stake 1706 cools and solidifies, it may contract and pull away from the punch to allow the staking module 1700 and hence the punch are to be retracted without plastic sticking to the punch.

Due to the quick heating and cooling possible with the staking module described herein, a flash cycle 1402 can be included at the end of the staking cycle 1400 that occurs quickly after the stake is formed. Specifically, certain plastics may not cleanly contract and pull away from the punch. The flash cycle causes the punch surface to heat just the surface of the formed stake, allowing the stake to separate from the punch without plastic sticking to the punch. That is, the formed plastic releases cleanly from the punch. The flash cycle 1402 quickly allowed by the staking module described herein can speed processing of multiple parts and parts having multiple points of connection.

Figure 15:
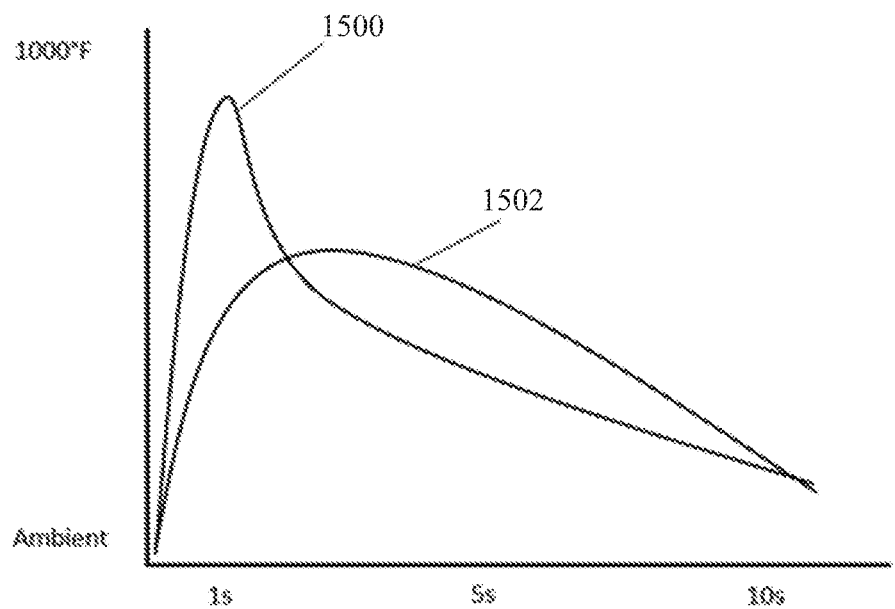
FIG. 15 is a graphical illustration of a heat cycle comparing the control temperature to the actual punch surface temperature.

FIG. 15 is one example of a heat cycle that can be used to form stakes using implementations of the staking module described herein. The graph compares the control temperature 1500 to the punch surface temperature 1502 over time on the horizontal axis. The control temperature 1500 may be detected by the RTD circuit integrated into the heating element 140. This is desirable because the proximity of the RTD circuit to the punch face allows the punch temperature to be reliably modelled based on the RTD temperature. While this is desirable due to its higher level of accuracy over sensing temperature in other ways, such as a thermocouple reading, it is not necessary. In an alternative implementation, detection of the temperature may be performed by a temperature sensor located adjacent to the heating element 140 (e.g., attached to the wall of the punch assembly 120).

As shown in FIG. 15, the heating element, such as the heating element 140, may be driven to a temperature exceeding the desired punch temperature. This overshoot, seen in the control temperature 1500, compensates for the heat transferred to the plastic and brings the punch surface to the desired temperature more quickly. Programming this overshoot into the control logic of the punch module can minimize the time required to achieve the desired steady-state punch temperature. The heat cycle of FIG. 15 is shown by example only. Different compositions of plastic used to form the boss may require different heat cycles. The control logic of the punch module is not shown, but it may be included in a control program operated by a computer or other processor-controlled device that is connected to the electrical cord 114, the air source and/or the support or actuator coupled to the mounting end 160 and controlling the movement of the staking module.

Figure 16:
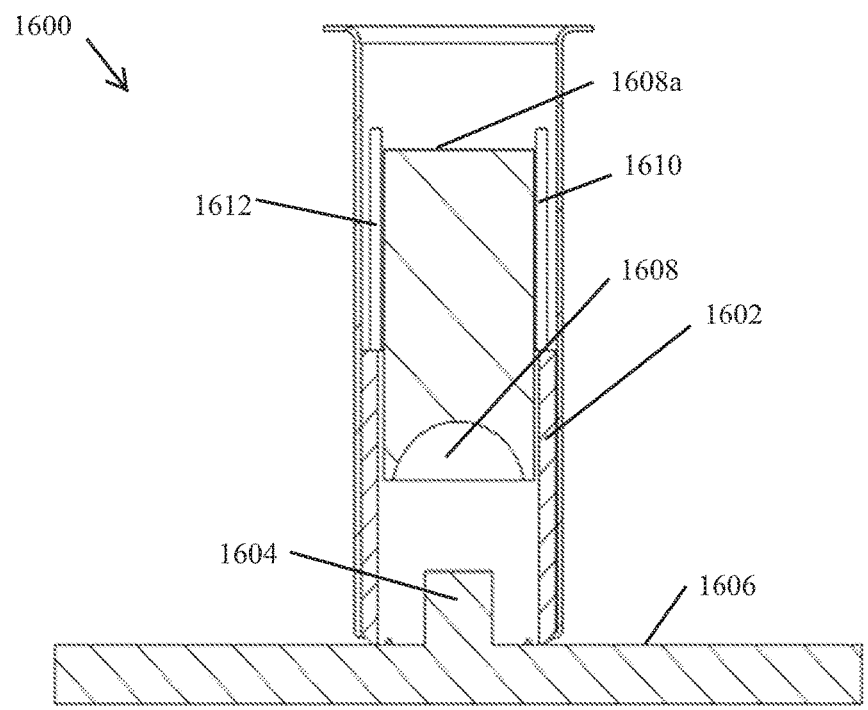
FIG. 16 is a section view of a second implementation of a staking module according to the teachings herein.

FIG. 16 is a section view of a second implementation of a staking module 1600 according to the teachings herein. The staking module 1600 includes a tubular heating element 1602. The tubular heating element 1602 may, like the heating element 140, may be formed of a solid state ceramic resistant heating element. The tubular heating element 1602 surrounds a boss 1604 and rests against the surface 1606 of a part to be secured to another part by the staking. The surface 1606 may be referred to as an A-surface, and it may be the surface visible when the staked part is incorporated into a product. Convection and radiation from the tubular heating element 1602 may be used to heat the axial surface of the boss 1604. Heating the axial surface may result in more even heating of the boss. A more evenly heated boss can be reformed to a stake that is stronger than a stake heated via conduction from the top surface. A punch 1608 moves through the center of the tubular heating element 1602 to form the stake using a concave surface of the punch 1808. Although not shown in FIG. 16, a suitable support for the punch 1608, similar to the module body 110 for example, may be incorporated to raise and lower the punch 1608.

The tubular heating element 1602 may be energized by a power source fed through a wire connector 1610, and may be cooled by (e.g., pressurized) air fed through a supply hose 1612. The tubular heating element 1602 can be used independently or in conjunction with the heating element 140 described above. In other words, the heating element 140 could be used in contact with the surface 1608a of the punch 1608.

As mentioned above, the heating element 140 shown and described is one option for heating the punch 122. Another option for a heating element is an infrared emitter (e.g., a halogen lamp). In the event an infrared emitter is used, the electrical cord 114 may be connected to a lamp holder directly or through the use of a support structure, such as the supporting structure 150. The lamp holder may be formed as an integrated unit that has an internal source of power. The lamp holder may instead or additionally use an external source of power. Optionally, a plenum may surround at least part of the heating element. The plenum may be formed of gold, or at least its interior is coated with gold. Another heat conductive material with high cooling capability can also be used. The plenum can have a diameter that forms a gap within the punch module 120 that directs air largely around the infrared emitter and onto the back side of the punch 122 for cooling both.

The staking module described herein can use a low thermal mass punch and a low-mass, high-power density, solid state, ceramic, resistant heating element pressed against the back of the punch to heat the punch surface. The staking module can be heated and cooled quickly and used to stake plastic parts of various shapes, sizes and configurations.

The punch requires energy only while the stake is being formed. The heating element converts electric power to heat quickly and efficiently and the heat is transferred to the punch surface efficiently, thus requiring minimal energy to complete the staking process. Because the punch has minimal mass to cool, the air volume required to bring the heating element and punch to a temperature that allows the punch to release cleanly from the formed plastic stake can be minimized.

According to certain implementations described herein, a low mass, high power (watt) density, solid state, ceramic, resistant heating element with integrated RTD attached directly to the back of a low thermal mass forming punch is highly responsive and controllable. The heating element can be ramped up quickly and held at a steady state temperature that closely matches the actual temperature of the punch surface for a preset time period. A punch temperature profile that considers the physical characteristics of individual plastics such as thermal conductivity and degradation temperature can be developed. The physical properties of the punch allow a relatively fast process that produces good quality stakes without marking the display surface. Furthermore, the staking module including these elements requires relatively low capital cost and less energy to operate than comparable processes. The small physical size of the staking module allows it to be positioned into tight spaces to stake bosses that may not be accessible using other common staking methods. Finally, the punch cools quickly so that by the time an operator is reaching into a machine to unload a part, the punch is cool to the touch.

What is claimed is:

1. An apparatus, comprising:
    a punch having a cavity on a first side, a contact surface on a second side opposite the first side, and a flange extending radially about an outer surface of the punch, the punch formed of a thermally-conductive material;
    an annular housing having a first end and a second end opposite to the first end, the first end defining an opening, wherein the flange is engaged with the first end about the opening, such that first side of the punch extends from the first end of the annular housing away from the opening and the second side of the punch faces an interior of the annular housing;
    a heating element located inside the annular housing, wherein an output side of the heating element is in contact with the contact surface of the punch within the interior of housing, the contact surface having a shape conforming to a shape of the output side of the heating element;
    an air inlet for pneumatically coupling the interior of the annular housing to an air source for flowing air across at least one of the heating element or the punch;
    an electrical cord for electrically coupling a power source to the heating element; and
    a mounting bracket for coupling with a support structure or actuator that provides force and motion.

2. The apparatus of claim 1, wherein the heating element comprises a thermally conductive electrical insulator body with a heater trace formed on an input side opposite the output side.

3. The apparatus of claim 2, wherein the insulator body comprises at least one of aluminum nitride or boron nitride.

4. The apparatus of claim 1, further comprising:
    a solid state, ceramic, resistant heating element in a tubular form surrounding the punch and the heating element.

5. The apparatus of claim 1, further comprising:
    a resistance temperature detector circuit integrated with the heating element.

6. The apparatus of claim 1, further comprising:
    multiple slots in the annular housing adjacent to the first end to allow the air from the air inlet to exhaust out of the annular housing, the slots exposing the heating element.

7. The apparatus of claim 1, wherein the annular housing comprises a module body with a first module end and a second module end, a punch assembly with the first end engaged with the punch and a second end, and a coupling nut joining the second end of the punch assembly to the first module end.

8. The apparatus of claim 1, wherein the electrical cord includes wires ending in socket connectors for electrically coupling the heating element with a power source; and the apparatus further comprises:
    a support structure within the annular housing and supporting pogo pins, a respective pogo pin having a first end connected to a respective socket connector and a second end in contact with the heating element.

9. The apparatus of claim 8, wherein the wires include two power supply wires ending at a respective socket connector, two wires for a resistance temperature detector circuit integrated with the heating element ending at a respective socket connector, and one ground wire coupled to a ground contact of the housing.

10. The apparatus of claim 1, wherein the cavity has a semi-circular shape.

11. An apparatus, comprising:
    a punch having a cavity on a first side, a contact surface on a second side opposite the first side, and a flange extending radially about an outer surface of the punch, the punch formed of a thermally-conductive material;
    an annular housing having a first end and a second end opposite to the first end, the first end defining an opening, wherein the flange is engaged with the first end about the opening, such that first side of the punch extends from the first end of the annular housing away from the opening and the second side of the punch faces an interior of the annular housing;
    a heating element located inside the annular housing, wherein an output side of the heating element is in contact with the contact surface of the punch within the interior of housing, the contact surface having a shape conforming to a shape of the output side of the heating element, wherein:

the annular housing comprises a groove extending from the first end in parallel with a central axis of the annular housing;

the output side of the heating element is substantially flat;

an outer perimeter of the heating element has a groove aligned with the groove of the annular housing to fix orientation of the heating element relative to the annular housing; and an input side of the heating element includes a plurality of contact pads.

12. The apparatus of claim 11, further comprising:

a support structure within the annular housing that supports pogo pins for transferring signals through the annular housing, the support structure having a groove aligned with the groove of the annular housing to fix orientation of the support structure relative to the annular housing.

13. The apparatus of claim 11, wherein the flange includes a groove aligned with the groove of the annular housing.

14. An apparatus, comprising:

a punch having a cavity on a first side, a flat contact surface on a second side opposite the first side, and a circular flange extending about an outer edge thereof, the punch formed of a thermally-conductive material;

an annular housing engaged with the punch about the circular flange at a first end;

a heating element located inside the annular housing and having flat output side in contact with the contact surface of the punch, the heating element comprising a thermally conductive electrical insulator body, a heater trace and a resistance temperature detector circuit integrated with the thermally conductive electrical insulator body;

an electrical cord including wires ending in socket connectors for electrically coupling the heating element with a power source; and a support structure within the annular housing and supporting pogo pins, a respective pogo pin having a first end connected to a respective socket connector and a second end in contact with an input side of the heating element.

15. The apparatus of claim 14, wherein the punch comprises titanium.

16. The apparatus of claim 14, wherein:

the annular housing comprises a groove extending from the first end in parallel with a central axis of the annular housing;

an outer perimeter of the heating element has a groove aligned with the groove of the annular housing to fix orientation of the heating element relative to the annular housing;

the input side of the heating element includes a plurality of contact pads; and the support structure has a groove aligned with the groove of the annular housing to fix orientation of the support structure relative to the annular housing.

17. The apparatus of claim 16, further comprising:

an air inlet for pneumatically coupling the annular housing to an air source for flowing air across at least one of the heating element or the punch.

18. The apparatus of claim 16, wherein:

the annular housing comprises a module body with a first module end and a second module end, a punch assembly with the first end engaged with the punch and a second end, and a coupling nut joining the second end of the punch assembly to the first module end; and the punch assembly comprises a locating tab at the second end, the locating tab fitting within slot at the first end of the module body between threads for the coupling nut to orient the punch assembly relative to the module body.

19. The apparatus of claim 14, further comprising:

an air inlet for pneumatically coupling an interior of the annular housing to an air source for flowing air across at least one of the heating element or the punch; and a mounting bracket for coupling with a support structure or actuator that provides force and motion.

* * * * *